United States Patent
Allen et al.

(10) Patent No.: US 9,471,626 B2
(45) Date of Patent: *Oct. 18, 2016

(54) ENHANCED ANSWERS IN DEEPQA SYSTEM ACCORDING TO USER PREFERENCES

(71) Applicant: International Business Machines Corporation, Armonk, NY (US)

(72) Inventors: Corville O. Allen, Durham, NC (US); Scott Robert Carrier, Durham, NC (US); Scott N. Gerard, Research Triangle Park, NC (US); Sterling Richardson Smith, Research Triangle Park, NC (US); David Blake Styles, Research Triangle Park, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,066

(22) Filed: Dec. 16, 2015

(65) Prior Publication Data

US 2016/0103873 A1 Apr. 14, 2016

Related U.S. Application Data

(63) Continuation of application No. 14/485,747, filed on Sep. 14, 2014, now Pat. No. 9,244,911, which is a continuation of application No. 13/843,557, filed on Mar. 15, 2013.

(51) Int. Cl.
*G06F 17/27* (2006.01)
*G06F 17/30* (2006.01)

(52) U.S. Cl.
CPC ..... *G06F 17/30401* (2013.01); *G06F 17/2785* (2013.01); *G06F 17/3053* (2013.01); *G06F 17/30654* (2013.01); *G06F 17/30867* (2013.01); *G06F 17/30424* (2013.01)

(58) Field of Classification Search
CPC ............... G06F 17/27; G06F 17/2705; G06F 17/2785; G06F 17/30386; G06F 17/30401; G06F 17/30424; G06F 17/3043; G06F 17/30654

See application file for complete search history.

(56) References Cited

U.S. PATENT DOCUMENTS

| | | | |
|---|---|---|---|
| 6,795,808 B1* | 9/2004 | Strubbe | G06F 17/30702 704/270 |
| 2002/0133347 A1* | 9/2002 | Schoneburg | G06F 17/27 704/257 |
| 2003/0182123 A1* | 9/2003 | Mitsuyoshi | G10L 17/26 704/270 |
| 2004/0019484 A1* | 1/2004 | Kobayashi | G10L 13/02 704/258 |
| 2004/0249634 A1* | 12/2004 | Degani | G10L 17/26 704/207 |
| 2011/0141258 A1* | 6/2011 | Song | G06K 9/00268 348/77 |

(Continued)

*Primary Examiner* — Eric Yen
(74) *Attorney, Agent, or Firm* — Robert H. Frantz; Reza Sarbakhsh

(57) ABSTRACT

A semantic search engine is enhanced to employ user preferences to customize answer output by, for a first user, extracting user preferences and sentiment levels associated with a first question; receiving candidate answer results of a semantic search of the first question; weighting the candidate answer results according to the sentiment levels for each of the user preferences; and producing the selected candidate answers to the first user. Optionally, user preferences and sentiment levels may be accumulated over different questions for the same user, or over different users for similar questions. And, supplemental information may be retrieved relative to a user preference in order to further tune the weighting per the preferences and sentiment levels.

18 Claims, 6 Drawing Sheets

(56) References Cited

U.S. PATENT DOCUMENTS

| | | | |
|---|---|---|---|
| 2012/0011139 A1* | 1/2012 | Drissi | G06F 17/30427 707/760 |
| 2013/0080169 A1* | 3/2013 | Harada | G10L 25/63 704/249 |
| 2013/0091130 A1* | 4/2013 | Barrow | G06F 17/30864 707/723 |
| 2014/0114648 A1* | 4/2014 | Eggink | G06F 17/274 704/9 |

* cited by examiner

ENHANCED ANSWERS IN DEEPQA SYSTEM ACCORDING TO USER PREFERENCES

CROSS-REFERENCE TO RELATED APPLICATIONS (CLAIMING BENEFIT UNDER 35 U.S.C. 120)

This is a continuation application of U.S. patent application Ser. No. 14/485,747, filed on Sep. 14, 2014, which was a continuation application of U.S. patent application Ser. No. 13/843,557, filed on Mar. 15, 2013, by Corville O. Allen, et al.

FEDERALLY SPONSORED RESEARCH AND DEVELOPMENT STATEMENT

None.

MICROFICHE APPENDIX

Not applicable.

INCORPORATION BY REFERENCE

The parent U.S. patent application Ser. No. 13/843,557, filed on Mar. 15, 2013, by Corville O. Allen, et al., is hereby incorporated by reference in its entirety.

FIELD OF THE INVENTION

This is a continuation application of U.S. patent application Ser. No. 13/843,557, filed on Mar. 15, 2013, by Corville O. Allen, et al. The invention generally relates to answer production and ranking in deep question-answer architecture systems, including combinations of Natural Language Processing, Information Retrieval, Knowledge Representation and Reasoning, and Machine Learning technologies, and the field of open-domain question answering.

BACKGROUND OF INVENTION

Deep Question-Answering (DeepQA) is an application of and combination of the fields of advanced Natural Language Processing, Information Retrieval, Knowledge Representation and Reasoning, and Machine Learning technologies to the field of open-domain question answering, all executing on a suitable computing platform. Such methods of hypothesis generation, evidence gathering, analysis, and scoring may be effectively executed by a wide range of computing platforms.

International Business Machines Corporation (IBM) has published details of one such computing system, including computing methods and technologies that are able to assist humans with certain types of semantic query and search operations, such as the type of natural question-and-answer paradigm of a medical environment. IBM researchers and scientists have been working on DeepQA methods that are able to understand complex questions posed (and input) in natural language, and are able to answer the question with enough precision, confidence, and speed to augment human handling of the same questions within a given environment, such as a medical inquiry and diagnostic paradigm, strategic planning, etc.

Similarly, IBM has also published computing methods which combine semantic elements with information search elements to form Unstructured Information Management Architecture (UIMA), which is now maintained as an open source project by the Apache organization.

Whereas ample information is available in the public domain regarding DeepQA and UIMA, the present disclosure presumes those ordinarily skilled in the art may access and apply that information to realized embodiments of the following invention.

These types of search and query systems, including the prior art systems which perform searches in a non-DeepQA manner, may produce an overwhelming amount of answer data due to the ever-increasing volume of information which can be searched. The search and answer prioritization methods of these systems generally operates on the relevance of the results to the query.

The present inventors have realized, and expressly do not disclaim as a prior known problem in the art, that Natural Language Processing (NLP) question/answer systems analyze Natural Language (NL) input against a corpora of data to identify the 'correct' answer to the question. This approach is sufficient for backward-looking questions in which answers are more acute and factual in nature. But, as the inventors looked to employ these DeepQA systems for more forward-looking decision-making, the inventors discovered that the correct or best answer may be more obtuse and personal. This problem does not yet seem to be recognized in the art, to the best of the inventors' knowledge.

The present inventors have realized that the current approaches are insufficient in this emerging domain. Humans are unique individuals varying widely in their view of the world (religious, political, societal, cultural, etc.). Therefore, there exists a need in the art for humans interfacing with these systems to influence the generated answers beyond the factual data (e.g. relevance) fed to the system and contained in the corpora.

For example, an oncology patient's medical information and history is fed to a query system, such as a DeepQA system, for analysis against the most recent guidelines, research and treatment regimen to generate the "best available" treatment options. The query system, based solely on this patient's information, might always generate a treatment plan consisting of chemotherapy as the correct or best answer due to superior effectiveness data. But, what if the patient is adamantly opposed to undergoing chemotherapy for a variety of reasons? The oncology professional must now manually cull through the answers to look for answers which avoid or minimize the use of chemotherapy, thereby rendering the traditional query system of limited use. This is where existing solutions fall short, and where the need exists for an invention which would allow for the patient to communicate to the system in NL that "I want to avoid chemotherapy". Such an invention, according to the present inventors' discoveries, would then attempt to identify the best sequence of treatment options in accordance with the user's preferences.

In a second example from a different field of use, imagine that an investment portfolio manager who is looking to invest in overseas commodity supplier trading might ask a traditional query system about which commodities are poised for growth and which countries stand to benefit. Now imaging that her clients are ecologically conscious and they prefer investing in institutions employing "green technology as much as possible". Traditional query systems may not be able to employ such a fuzzy requirement in their answer ranking and relevance engines, so there is a need in the art identified by the present inventors and not recognized by those skilled in the art for a mechanism to allow such a portfolio manager to indicates to the query system a user preference in natural language such as "prefer eco-friendly institutions and countries the most".

SUMMARY OF THE INVENTION

A semantic search engine is enhanced to employ user preferences to customize answer output by, for a first user, extracting user preferences and sentiment levels associated with a first question; receiving candidate answer results of a semantic search of the first question; weighting the candidate answer results according to the sentiment levels for each of the user preferences; and producing the selected candidate answers to the first user. Optionally, user preferences and sentiment levels may be accumulated over different questions for the same user, or over different users for similar questions. And, supplemental information may be retrieved relative to a user preference in order to further tune the weighting per the preferences and sentiment levels.

BRIEF DESCRIPTION OF THE DRAWINGS

The description set forth herein is illustrated by the several drawings.

DETAILED DESCRIPTION OF EMBODIMENT(S) OF THE INVENTION

Figure 1:
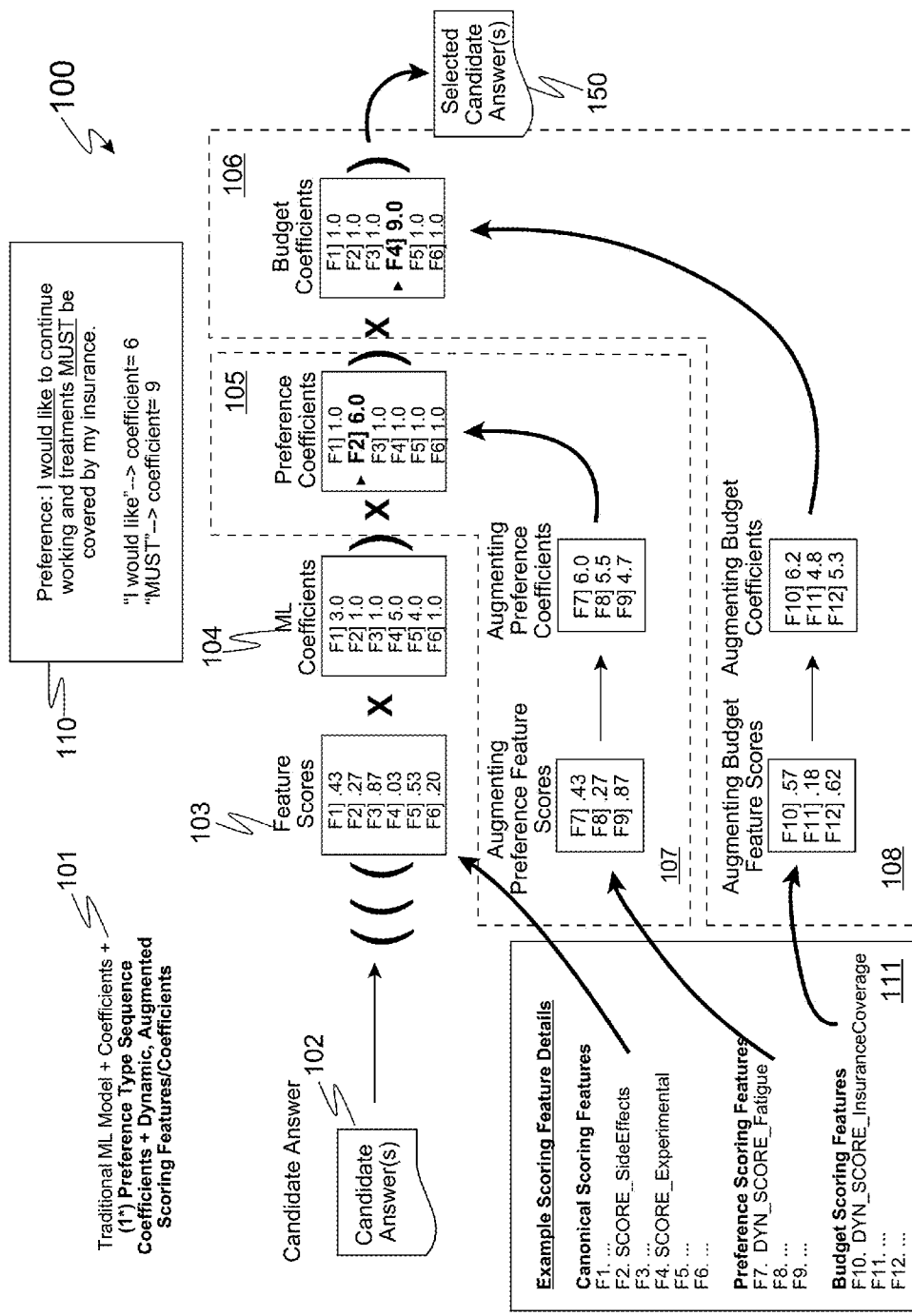
FIG. 1 provides a detailed view of the information processing according to at least one embodiment of the present invention.

As set forth in the Background of the Invention section of this disclosure, the present inventors have recognized and anticipated problems not yet recognized by those skilled in the relevant arts. Although semantic search engines provide greatly improved results than non-semantic search engines for complex questions and queries, the resulting candidate answers are not attune to the user's own preferences. So, with the systems available in the present art, the use must still cull through the candidate answers to further select and eliminate answers according to his or her preferences. The present inventors have recognized this need for a semantic search engine to be enhanced to further consider one or more user preferences, not only to filter the semantic search results, but also to deepen the search or subsequent searches in order to find and reveal even more interesting candidate answers for a particular user.

Deep QA Systems in General.

Embodiments according to the present invention provide an enhancement to deep question-answer (DeepQA) information handling computing systems, i.e., those computing systems which answer natural language questions by querying data repositories and applying elements of language processing, information retrieval, and machine learning to arrive at a conclusion.

Relevancy search engines may use any or all of the following processes: pattern matching, deep semantic relationship detection, shallow semantic relationship detection, scoring, weighing, logic matching, and natural language processing. One such available technology is the Watson™ architecture by International Business Machines (IBM)™.

As stated in the background section of the present disclosure, IBM has published details of computing methods and technologies that are able to assist humans with certain types of semantic query and search operations, such as the type of natural question-and-answer paradigm of a medical environment. IBM researchers and scientists have been working on Deep Question-Answering (DeepQA) methods that are able to understand complex questions posed (and input) in natural language, and are able to answer the question with enough precision, confidence, and speed to augment human handling of the same questions within a given environment, such as a medical inquiry and diagnostic paradigm where time-to-answer is of the essence.

DeepQA is an application of advanced Natural Language Processing, Information Retrieval, Knowledge Representation and Reasoning, and Machine Learning technologies to the field of open-domain question answering, all executing on a suitable computing platform. Such methods of hypothesis generation, evidence gathering, analysis, and scoring may be effectively executed by a wide range of computing platforms.

Similarly, IBM has also published computing methods which combine semantic elements with information search elements to form Unstructured Information Management Architecture (UIMA), which is now maintained as an open source project by the Apache organization.

Deep Semantic Relationship Detection and Analysis.

The term "deep semantic" relationships for the purposes of the present disclosure is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold (store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680).

One may contrast deep semantic relationships with shallow semantic relationships, that latter of which usually only consider the structure of parts of speech within a sentence, and not necessarily the meanings of those words. An example shallow relationship may simply be of the form sentence (subject, verb, object). In the above example, this would be sentence (john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

Whereas ample information is available in the public domain regarding DeepQA, deep semantic relationship detection and analysis, and UIMA, the present disclosure presumes that persons who are ordinarily skilled in the relevant arts may access and apply that information to realized embodiments of the following invention.

Logical Processes According to the Invention.

The following logical processes may be realized by a microprocessor (hardware) executing program code or program instructions, by custom electronic circuits (hardware), or a combination of microprocessor, program and circuits. Within this disclosure, references to memories, devices, and storage shall refer to well-known data storage hardware, and shall not be construed to refer to signals, neither modulated nor propagating.

A core concept of the present invention is the utilization of user preferences in DeepQA systems, such as the aforementioned semantic search engines, to customize the best or correct answers for each unique user interfacing with the system, rather than the current predefined one-size-fits-all approach to answer scoring.

Figure 2:
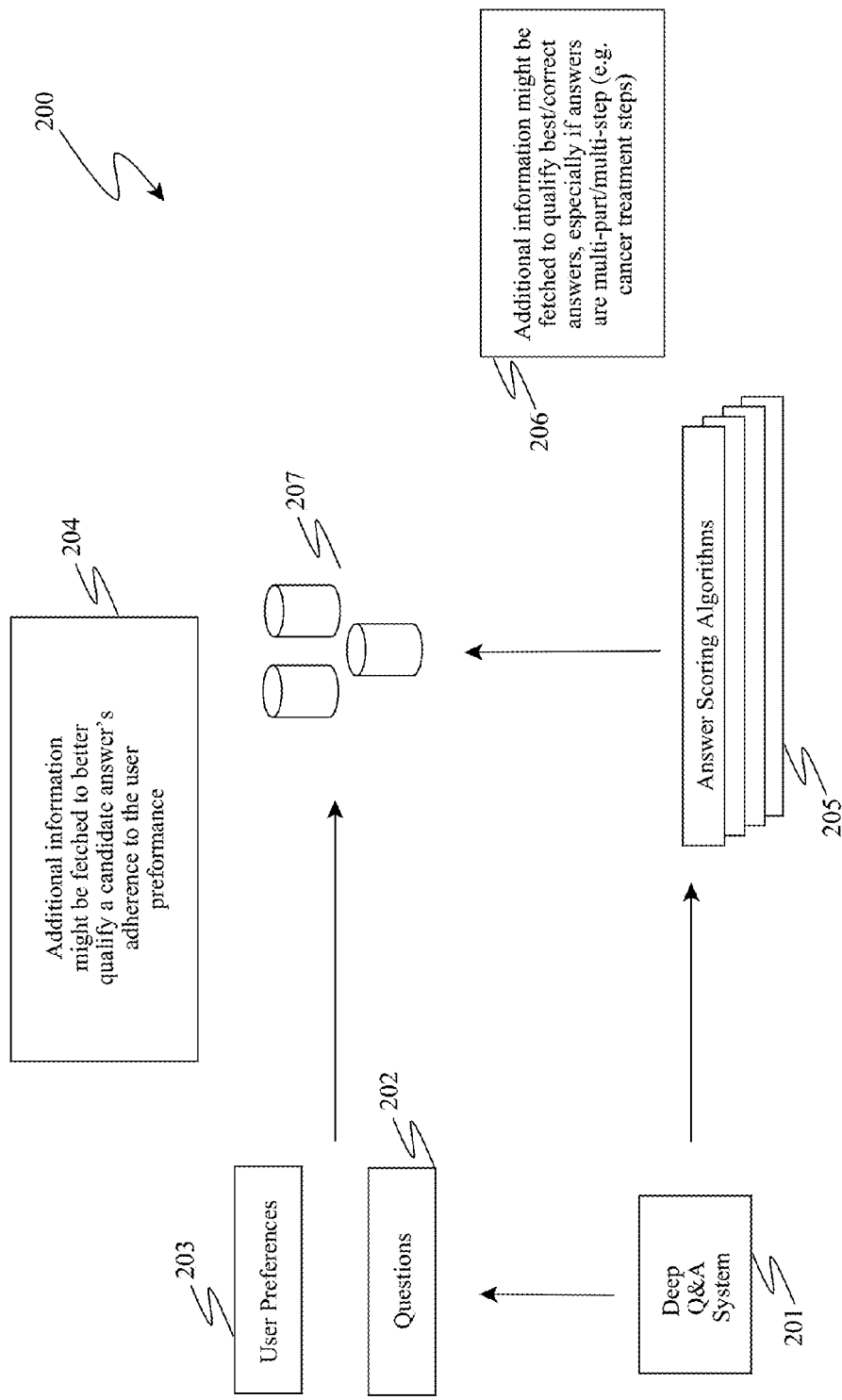
FIG. 2 illustrates from a high-level the supplemental candidate answer processing according to the present invention.
Figure 3:
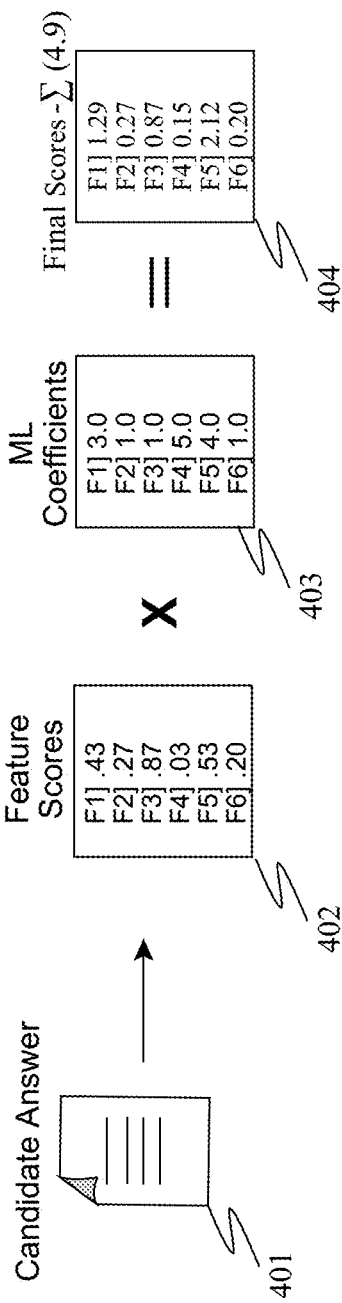
FIG. 3 shows the well-known semantic search data processing approach using machine learning model.

As shown in FIG. 2, in embodiments according to the present invention, user preferences (203) are utilized by the semantic search engine (201) in both (a) the fetching (205) of candidate answers, and (b) the methods determining the best or most correct sets of answers (202) to be presented (207) to the user. Depending upon the complexity of the user's preferences, additional information (204) may be fetched by the semantic search engine to determine whether a particular candidate answer adheres to the preferences. And, additional information (206) might also be fetched by the semantic search engine on the best or most correct answers to further qualify their values within both the context of the question and user preferences therein.

As previously stated, a core concept of this invention is to utilize a weighted set of user preferences that vary based on the sentiment level of those preferences when scoring the potential candidate answers such that, when these weighted user preferences are introduced, they affect the final answer scores based on the level of sentiment they carry. As a result, candidate answers that are presented to the user as a result of the semantic search are tailored to the user's preferences more that search results of traditional search engines.

Within the weighted set of preferences, the ranking of a preference is factored into the final score for a candidate answer, which will affect the weight for that feature when aggregating the score.

At least one advantage of this method is that it is not merely a simple filter across candidate answers, or a simple negation based on final answers, but instead the enhanced semantic search engine uses the sentiment strength (e.g. sentiment level) of the actual user preferences to build a scoring system that can be used across multiple data dimensions without a lot of changes.

Another advantage of the methods according to the present invention is that, as the data sets accumulate and the preferences from the users grow within the system, a user preference-based machine learning model can contribute to the weighted preferences answer set to make the final candidate answer scores more accurate.

For example, consider a portfolio manager who is looking to invest in overseas commodity supplier trading. This portfolio manager might ask the semantic search engine system which commodities are poised for growth and which countries stand to benefit the most. And, assume that the portfolio manager's clients are eco-conscious and prefer investing in institutions employing "green" technology. The portfolio manager, therefore, inputs into the semantic search engine the following natural language (NL) preferences:

"weight eco-friendly institutions and countries more heavily."

Similarly, the preferences may be input in another NL phrase, such as:

"prefer eco-friendly institutions and/or countries".

The semantic search system would then fetch additional data on institutions to identify their environmental track records, and it would weight that information more heavily in identifying the best or most correct answer.

This provides a unique and substantial advantage to search systems which have fixed or non-user-modifiable answer scoring algorithms. By allowing user preference inputs, especially in natural language, to modify the scoring of the answers, then the end-users are actually enabled to skew the candidate answer (CA) weights beyond factors deemed most important in machine learning (ML) training.

In this example, "eco-friendly" was stated as a condition by the user of the semantic search engine. Answer Engines (AEs) inside the semantic search engine can qualify "eco-friendly" (i.e. what it means and what qualifiers constitute the condition). From the set of condition qualifiers, we can determine which are most essential using various algorithms/metrics such as Inverse Document Frequency and others. After the semantic search engine has resolved the pertinent qualifiers of the preference term "eco-friendly", another Answer Engine (AE) can gather additional data as needed to qualify and score the candidate answers. These scores are weighted heavily in the system, regardless of ML parameters. The actual weight can be keyed off how strong or weak the condition was expressed, e.g. "carbon neutral companies only" versus "I favor eco-conscious institutions". The former is a strong condition (only), and the latter is a weak condition (favor, but not require).

Figure 4:
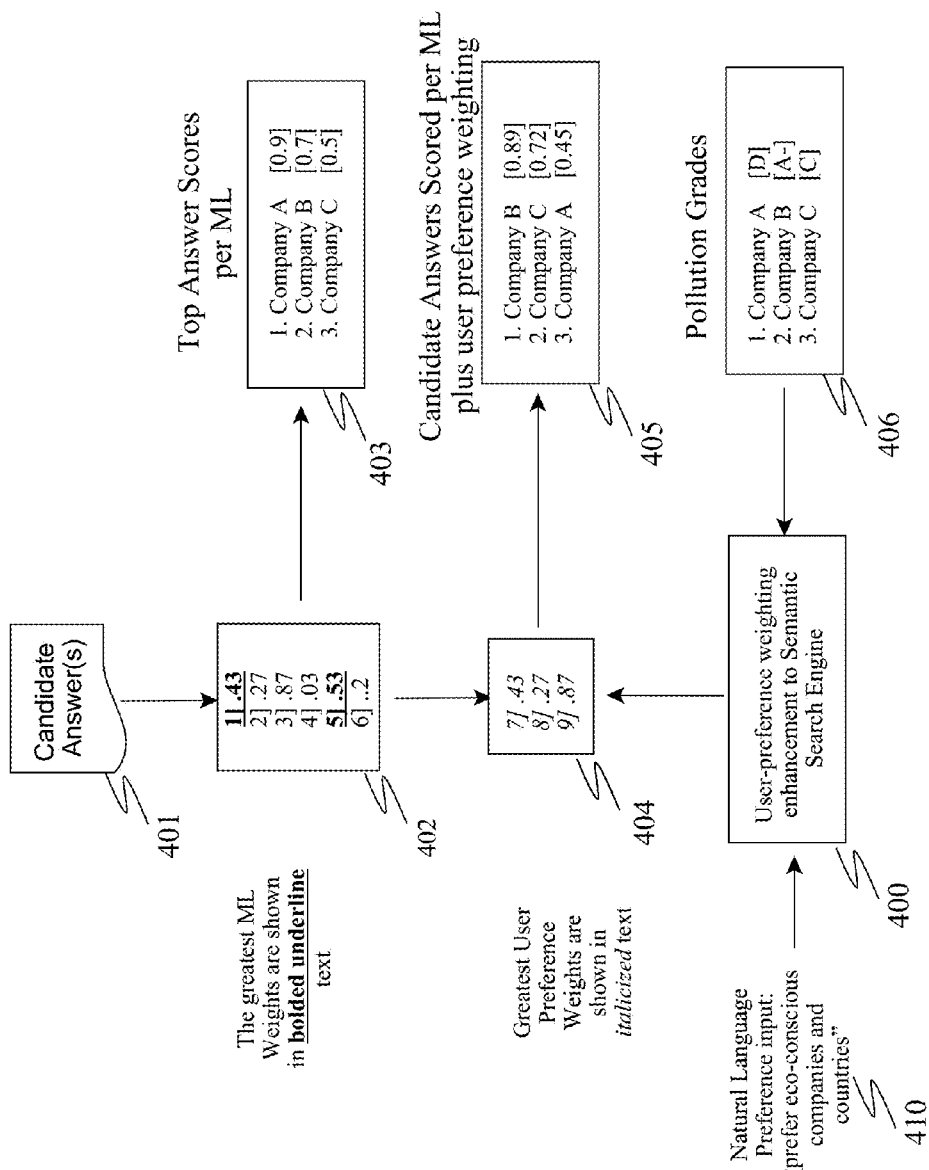
FIG. 4 provides a functional depiction of the enhancements of the present invention to a semantic search engine relative to the machine learning model of FIG. 3.

Turning to FIG. 4, feature scores for candidate answers (401) are multiplied by Machine Learning coefficients (402), wherein the ML coefficients express credibility of the feature score under the current circumstances, much as is done in present-day search engines. However, in today's search engines, the scoring would stop here, to yield a set of final scores (403). However, incorporation (400) of the NL user-preference methods of the present invention of weighted preferences (404) is done in a such a way that the final answer scores (405) reflect the user's preference, such as identifying Company B, not Company A, as being the more eco-friendly company. The greatest user preference weights (404) are weighted based on how strongly the preferences are expressed in the user's natural language preference input (410). The final ranking, according to the present invention, will affect the weight of the preference when scoring.

Now turning to FIG. 1, a more detailed depiction of the operation (100) of a method according to the present invention is provided, which includes a traditional machine learning (ML) model plus coefficients, in addition to the new Preference-Type Sequence Coefficients, as well as the new Dynamic, Augmented Scoring Features and Coefficients. Unlike today's search engine pipeline, the presently-disclosed method provides for multiplying feature scores (103) for candidate answers (102) with a series of coefficient sets (104, 105, 106, etc.), wherein each set of coefficients may express different things. As shown, feature scores are first multiplied with the usual Machine Learning coefficients (104). Next, these intermediate results are multiplied with the user's preference coefficients (105), wherein these coefficients express a patient's preference toward the feature score. For example, if the patient refuses to quit smoking, a user preference coefficient of 0 may be set for the "Change lifestyle" feature score. This will zero-out the feature score and remove candidate answers which involve reducing or quitting smoking as a possible final answer.

Further extending this example, a "Budget" coefficient set (106) may be employed to represent a patient's ability to pay for a proposed treatment. If a treatment is relatively inexpensive and the patient has limited financial capability to pay, a higher co-efficient may multiply the final score of the less or least expensive treatment, making it a more likely candidate answer.

By default, all preference-type coefficients may be set 1, effectively making those coefficient a "no-op" (no operation) until explicitly set by the system to something else. As feature scores are augmented (107, 108, 111) with additional, untrained values, the coefficient sets may also be expanded with default values of 1. Again, this makes the multiplication process a "no-op" for those features, and preserves the original feature score as a final candidate answer score.

To generalize from such a detailed example, methods according to the present invention provide enhancements and improvements to a semantic search engine, such as a question-and-answer system, to utilize the set of user-provided preferences which have been given a level of user sentiment to select applicable candidate answers from among a broader set of candidate answers. Components of some embodiments will include at least one set of user preference feature scores which will augment existing feature scores and, which may override a feature coefficient of the same feature score. A plurality of preference coefficients are then applied across relevant feature scores, where the plurality of preference coefficients affects the score based on the preference sentiment level, by increasing or reducing the final answer scores used for determining candidate answers.

In some embodiments, the preference coefficients will include a sentiment value for how strongly the user feels about the preference (as input by the user), a coefficient value which is partly determined by the sentiment value, and an associated mathematical operation type as to how the coefficients should be applied to feature scores (e.g. scale by multiplying, offset by adding or subtracting, etc.).

Further, in some embodiments, the plurality of preference coefficients are applied in a modifiable order according to a routing and processing path, and augmented feature scores are incorporated within the routing path which are applicable only when preference sentiment are included which increases, reduces or sets to zero feature score values used to determine the candidate answers.

Yet still in some embodiments, the plurality of preference coefficients are applied using different methods such as linear, quadratic and differential equations, depending on the preference feature score types and preference type.

Figure 5:
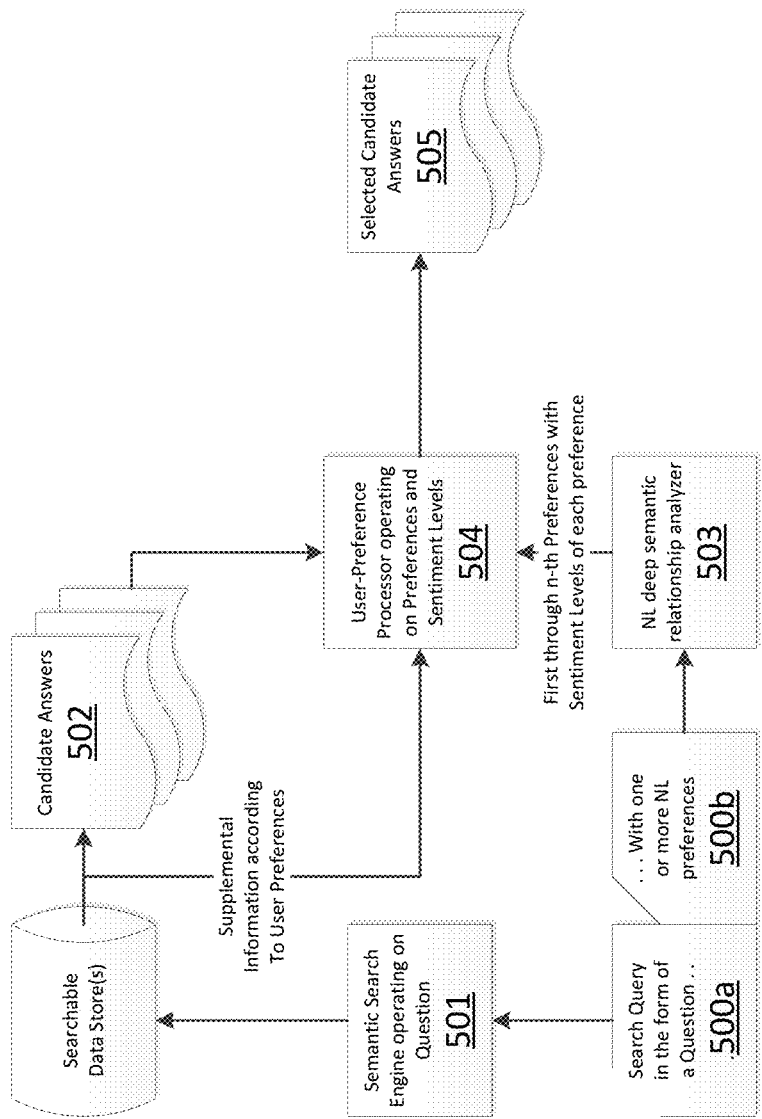
FIG. 5 illustrates an arrangement of components of a system according to the present invention.

Referring now to FIG. 5, a generalized architecture of components in an arrangement according to the present invention is shown. A search query in the form of a question (500a) is received by a semantic search engine (501), such as the IBM Watson system, or similar. The semantic search engine performs a search according to the question of one or more searchable data stores, such as local databases, remote databases, electronic documents, web pages, electronic catalogs, etc. The results of this semantic search are a set of candidate answers (502). Simultaneously, or sequentially, a natural language preference (500b) associated with the question (500a) is received by a natural language deep semantic relationship analyzer, which extracts one or more user preferences, and assigns a user sentiment level to each of the preferences. For example, language such as "only give me <criteria_1>" would be identified as a strong sentiment level for criteria_1 whereas the word "only" can be designated in a preference lexicon as a strong limiter. And, a preference using language such as "it would be nice if the answer had <criteria_2>", then criteria_2 would be assigned a weak sentiment level because the phrase "nice if" can be designated in a preference lexicon as a weak limiter. Other examples of terms and phrases which indicate sentiment can include, but are not limited to:

Strong: only, always, never, reject, unacceptable, no way, strike, eliminate, forget, not OK, etc.

Neutral: possibly without, possibly without, don't care, regardless, ignore, anything, in any way, etc.

Weak: avoid, nice if, prefer, lean towards, lean away, inclined, disinclined, would be acceptable, would be OK, etc.

To realize a dynamically extendable preference weighting enhancement to the logical process of semantic search engines, the User-Preference Processor operating on Preferences and Sentiment Levels (504) may operate in a loop (or multiple instances), which, for each traversal of the processing loop, considers another user preference and sentiment level by multiplying it as previously described by the intermediate product of the previous loop's results, until the $N^{th}$ user preference has been processed, such that all N preferences are factored into the final selected candidate answers (505). In this manner, the user may indirectly extend the weighting logic of the overall semantic search by indicated more and more preferences associated with the question. The analyzer (503) will extract all of the preferences, which will cause a traversal of the processing loop for each of the extracted preferences. In another implementation approach, an instance of a user preference weighting multiplier may be instantiated for each of the N preferences, such that the user preference weighting can be performed in parallel instead of serially via a processing loop.

Suitable Computing Platform.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 6:
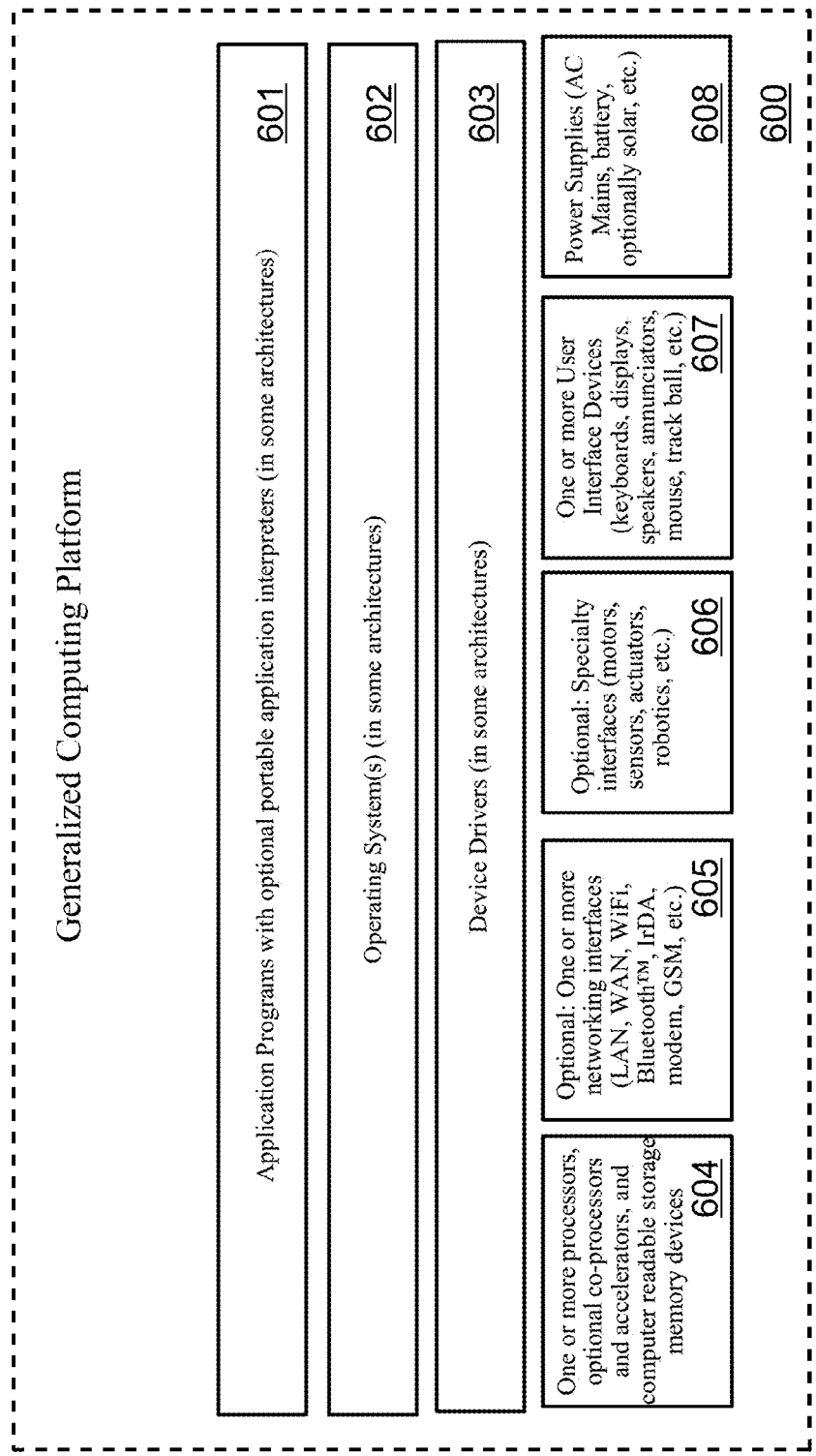
FIG. 6 sets forth a generalized perspective of common components of a computing platform, including one or more microprocessors and specialized circuitry for tangible, computer-readable memory devices and communications interfaces, as well as one or more software programs executed by the microprocessor(s).

The present and related inventions may be realized for many different processors used in many different computing platforms. FIG. 6 illustrates a generalized computing platform (600), such as the aforementioned IBM Watson or IBM's BlueGene platform, or potentially other computing platforms such as "Personal Computers", web servers such as an IBM iSeries™ server, and portable devices such as personal digital assistants and smart phones, running a popular operating systems (602) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (601) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (604) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (605) may be provided, as well as specialty interfaces for specific applications. If the computing platform is intended to interact with human users, it is provided with one or more user interface devices (607), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for using user preferences to customize answer output comprising the steps of:
    for a first user and a first question:
        extracting by a natural language processor from the question one or more user preferences and one or more sentiment levels;
        performing by a computer a semantic search on of the first question;
        receiving by a computer a plurality of candidate answers from the semantic search;
        selecting by a computer one or more of the received candidate answers, wherein the selection is performed both according to the one or more sentiment levels and according to the one or more user preferences; and
        producing by a computer a first user output including the selected one or more candidate answers;
    for a second question and a second user, repeating by a computer the step of extracting preferences from the second question;
    accumulating by a computer the preferences and sentiments extracted from the second question with the preferences and sentiments extracted from the first question; and
    for the second question, repeating by a computer the steps of performing a semantic search, receiving candidate answers, selecting candidate answers according to the accumulated preferences and sentiments, and producing a second output.

2. The method as set forth in claim 1 further comprising the steps of:
    for the first user and a third question, extracting by a natural language processor one or more user preferences and one or more sentiment levels, wherein each user preference and each sentiment level is associated with the third question, or associated with the first user, or associated with both the third question and the first user;
    searching semantically by a computer on the third question;
    receiving by a computer a plurality of candidate answers from the semantic search on the third question;

selecting by a computer one or more of the received candidate answers from the search on the third question, wherein the selection is performed according to a combination of the one or more sentiment levels and according to the one or more user preferences associated with the first and second users and with the first, second and third questions; and producing by a computer a third user output including the selected one or more candidate answers selected from the search on the third question.

3. The method as set forth in claim 2 further comprising detecting by a computer that the first question is similar to at least the third question.

4. The method as set forth in claim 1 further comprising retrieving by a computer supplemental information regarding the candidate answers, wherein the supplemental information is related to one or more of the user preferences, and wherein the supplemental information is used to adjust the selecting.

5. The method as set forth in claim 1 further comprising extracting by a computer semantic elements according to an architecture for managing unstructured information.

6. The method as set forth in claim 1 wherein the selecting comprises a weighting process.

7. A computer program product for using user preferences to customize answer output comprising:
   a computer readable, tangible storage device; and
   program instructions stored by the computer readable, tangible storage device, which, when executed by a processor, cause a computing platform to:
      for a first user and a first question:
         extract by a natural language processor from the question one or more user preferences and one or more sentiment levels;
         perform a semantic search on of the first question;
         receive a plurality of candidate answers from the semantic search;
         select one or more of the received candidate answers, wherein the selection is performed both according to the one or more sentiment levels and according to the one or more user preferences; and
         produce a first user output including the selected one or more candidate answers;
      for a second question and a second user, repeat the step of extracting preferences from the second question;
      accumulate the preferences and sentiments extracted from the second question with the preferences and sentiments extracted from the first question; and
      for the second question, repeat the steps of performing a semantic search, receiving candidate answers, selecting candidate answers according to the accumulated preferences and sentiments, and producing a second output.

8. The computer program product as set forth in claim 7 further comprising program instructions stored by the computer readable, tangible storage device, which, when executed by a processor, cause a computing platform to:
   for the first user and a third question, extract by a natural language processor one or more user preferences and one or more sentiment levels, wherein each user preference and each sentiment level is associated with the third question, or associated with the first user, or associated with both the third question and the first user;
   search semantically on the third question;
   receive a plurality of candidate answers from the semantic search on the third question;
   selecting by a computer one or more of the received candidate answers from the search on the third question, wherein the selection is performed according to a combination of the one or more sentiment levels and according to the one or more user preferences associated with the first and second users and with the first, second and third questions; and
   produce a third user output including the selected one or more candidate answers selected from the search on the third question.

9. The computer program product as set forth in claim 8 further comprising program instructions stored by the computer readable, tangible storage device, which, when executed by a processor, cause a computing platform to detect that the first question is similar to at least the third question.

10. The computer program product as set forth in claim 7 further comprising program instructions stored by the computer readable, tangible storage device, which, when executed by a processor, cause a computing platform to retrieve supplemental information regarding the candidate answers, wherein the supplemental information is related to one or more of the user preferences, and wherein the supplemental information is used to adjust the selecting.

11. The computer program product as set forth in claim 7 further comprising program instructions stored by the computer readable, tangible storage device, which, when executed by a processor, cause a computing platform to extract semantic elements according to an architecture for managing unstructured information.

12. The computer program product as set forth in claim 7 wherein the program instructions which, when executed by a processor, cause a computing platform to select comprise program instructions which, when executed by a processor, cause a computing platform a weighting process.

13. A system for using user preferences to customize answer output comprising:
   a computing platform having a processor;
   a computer readable, tangible storage device; and
   program instructions stored by the computer readable, tangible storage device, which, when executed by the processor, cause a computing platform to:
      for a first user and a first question:
         extract by a natural language processor from the question one or more user preferences and one or more sentiment levels;
         perform a semantic search on of the first question;
         receive a plurality of candidate answers from the semantic search;
         select one or more of the received candidate answers, wherein the selection is performed both according to the one or more sentiment levels and according to the one or more user preferences; and
         produce a first user output including the selected one or more candidate answers;
      for a second question and a second user, repeat the step of extracting preferences from the second question;
      accumulate the preferences and sentiments extracted from the second question with the preferences and sentiments extracted from the first question; and
      for the second question, repeat the steps of performing a semantic search, receiving candidate answers, selecting candidate answers according to the accumulated preferences and sentiments, and producing a second output.

14. The system as set forth in claim 13 further comprising program instructions stored by the computer readable, tangible storage device, which, when executed by a processor, cause a computing platform to:

for the first user and a third question, extract by a natural language processor one or more user preferences and one or more sentiment levels, wherein each user preference and each sentiment level is associated with the third question, or associated with the first user, or associated with both the third question and the first user;

search semantically on the third question;

receive a plurality of candidate answers from the semantic search on the third question;

selecting by a computer one or more of the received candidate answers from the search on the third question, wherein the selection is performed according to a combination of the one or more sentiment levels and according to the one or more user preferences associated with the first and second users and with the first, second and third questions; and produce a third user output including the selected one or more candidate answers selected from the search on the third question.

15. The system as set forth in claim 14 further comprising program instructions stored by the computer readable, tangible storage device, which, when executed by a processor, cause a computing platform to detect that the first question is similar to at least the third question.

16. The system as set forth in claim 13 further comprising program instructions stored by the computer readable, tangible storage device, which, when executed by a processor, cause a computing platform to retrieve supplemental information regarding the candidate answers, wherein the supplemental information is related to one or more of the user preferences, and wherein the supplemental information is used to adjust the selecting.

17. The system as set forth in claim 13 further comprising program instructions stored by the computer readable, tangible storage device, which, when executed by a processor, cause a computing platform to extract semantic elements according to an architecture for managing unstructured information.

18. The system as set forth in claim 13 wherein the program instructions which, when executed by a processor, cause a computing platform to select comprise program instructions which, when executed by a processor, cause a computing platform a weighting process.

\* \* \* \* \*